UNITED STATES PATENT OFFICE.

SYDNEY MAKEPEACE WOOD, OF UPPER MONTCLAIR, NEW JERSEY.

FOOD COMPOSITION AND PROCESS OF PREPARING SAME.

1,311,843.     Specification of Letters Patent.     Patented July 29, 1919.

No Drawing.     Application filed March 19, 1919. Serial No. 283,511.

*To all whom it may concern:*

Be it known that I, SYDNEY MAKEPEACE WOOD, a citizen of the United States, residing at Upper Montclair, in the county of Essex and State of New Jersey, have invented a new and useful Food Composition and Process of Preparing Same, of which the following is a specification.

My invention consists of the production of a new, palatable and nutritious food composition and the process of making the same, which food composition is capable of retaining its food properties indefinitely without artificial preservatives, which is practically devoid of sedimentation and may be prepared so that it will retain a fluid state for a very considerable length of time.

My composition consists of a mixture of invert sugar syrup and cocoa with or without flavoring, milk, condiments, etc., as desired.

My process consists, first, in producing invert sugar syrup invert to such an extent that the associated proportions of dextrose and levulose, on the one hand, to the sucrose, on the other hand, are substantially equal in weight. By "substantially" in the previous sentence and in the claims I mean that the levulose and dextrose together are to be anywhere between the limits of thirty-five per cent. of sixty-five per cent. of the dry matter of the syrup, or when the sucrose is anywhere between thirty-five per cent. and sixty-five per cent. of the dry matter of the syrup; good results may be obtained anywhere between the aforesaid limits. By using an invert sugar syrup of the above proportions of dextrose, levulose and sucrose my process produces a food product composition which will retain its fluid state for a considerable length of time.

To the syrup I add cocoa with or without flavoring, milk, condiments, etc., as desired, in substantially the percentage of one pound of cocoa to eleven pounds of invert sugar syrup; the foregoing are the preferred proportions. By "substantially" in the previous sentence and in the claims I mean that the proportion of cocoa may be anywhere between five per cent. and fifty-five per cent. of the mixture, and good results be obtained. Water may be added in the proportion of substantially twenty per cent. of water to the mass, and by "substantially" in this sentence and in the claims I mean that the proportion of water in the mass may be anywhere between ten per cent. and thirty-three per cent. of the total mass.

I use the word "cocoa" in this specification and in the claims to designate all products of the nuts or beans of the cacao tree, and the form of the cocoa used is preferably the nuts or beans of the cacao tree in a finely powdered form.

After putting together the syrup and the cocoa, the mass is thoroughly mixed and then heated at or near the boiling point and there maintained for a short period and then preferably rapidly cooled. During the heating I keep the mass thoroughly stirred. In practice I have found that the best results are obtained when the mass is maintained near the boiling temperature for a period of forty to sixty minutes, although good results may be obtained when such temperature is maintained for a much shorter period (three or four minutes), or for a longer period (practically indefinitely), provided the mass is kept from burning.

The flavoring, seasoning, milk, milk products, nut meats, condiments, etc., may be added if and as desired as, or just before, or after the mass is cooled.

This process markedly develops the inate flavor of the cocoa. When the associated proportions of levulose and dextrose, on the one hand, and sucrose, on the other hand, are approximately equal in weight (or within the limits above mentioned), the product does not crystallize and will remain in a fluid state for a considerable length of time, is practically devoid of sedimentation of undissolved cocoa, and will keep indefinitely without artificial preservatives.

I claim:

1. A liquid food composition made up in the proportion of approximately one pound of cocoa to eleven pounds of invert sugar syrup, in which syrup the associated proportions of the dextrose and levulose to the sucrose are substantially equal.

2. A liquid food composition made up of invert sugar syrup and cocoa, in which the associated proportions of the dextrose and levulose to the sucrose in the syrup are substantially equal, and the proportion of the cocoa is substantially ten per cent. of the entire mass.

3. A liquid food composition made up of invert sugar syrup and cocoa, in which the associated proportions of the dextrose and levulose to the sucrose in the syrup are substantially equal, and the proportion of the cocoa is substantially ten per cent. of the entire mass, and wherein the proportion of water in the mass is substantially twenty per cent.

4. The process of making a food product which consists of inverting sugar to such an extent that the dextrose and levulose are substantially equal to the sucrose, then mixing the invert syrup with cocoa in the proportion of substantially one pound of cocoa to eleven pounds of syrup, then heating the mixture to substantially the boiling point, stirring said mixture during the heating, and then cooling the mixture.

5. The process of making a food product which consists of inverting sugar to such an extent that the dextrose and levulose are substantially equal to the sucrose, then mixing the invert syrup with cocoa in the proportion of substantially one pound of cocoa to eleven pounds of syrup, then heating the mixture and maintaining said heat for at least three minutes, stirring said mixture during the heating, and then cooling the mixture.

SYDNEY MAKEPEACE WOOD.

Witnesses:
SAMUEL S. WATSON,
F. A. SPAETH.